United States Patent [19]
Hametta

[11] 3,896,371
[45] July 22, 1975

[54] METAL DETECTOR WITH A RESONATING CIRCUIT BEING DRIVEN BY A FREQUENCY HIGHER THAN ITS NATURAL RESONANCE FREQUENCY

[76] Inventor: Allen W. Hametta, 629 Evergreen Pl., Buffalo Grove, Ill. 60090

[22] Filed: Dec. 17, 1973

[21] Appl. No.: 425,520

[52] U.S. Cl. .................................... 324/3; 331/65
[51] Int. Cl.[2] ........................................ G01V 3/10
[58] Field of Search ...................... 324/3, 5, 41, 40; 340/258 C; 331/65

[56] References Cited
UNITED STATES PATENTS

| | | | |
|---|---|---|---|
| 2,083,335 | 6/1937 | Loudon | 340/258 C X |
| 2,237,254 | 4/1941 | Broekhuysen | 324/41 X |
| 2,376,659 | 5/1945 | Chireix | 324/3 |
| 2,408,029 | 9/1946 | Bazzoni et al. | 324/5 |
| 2,550,607 | 4/1951 | Shoemaker | 324/3 X |
| 2,875,429 | 2/1959 | Quade | 324/41 UX |
| 2,895,108 | 7/1959 | Haddad et al. | 324/3 X |
| 2,939,073 | 5/1960 | Eul | 324/40 X |
| 2,972,116 | 2/1961 | Lowe | 340/258 C |
| 3,015,077 | 12/1961 | Elam et al. | 331/65 |
| 3,201,774 | 8/1965 | Uemura | 324/3 X |
| 3,467,855 | 9/1969 | Rance | 324/3 |
| 3,503,007 | 3/1970 | Kutschbach | 324/3 X |
| 3,546,628 | 12/1970 | Zitter | 324/3 X |
| 3,601,691 | 8/1971 | Gardiner | 324/3 |

*Primary Examiner*—Gerard R. Strecker
*Attorney, Agent, or Firm*—John J. Connors

[57] ABSTRACT

Concealed metal objects such as coins are detected by a metal detector including a novel discriminating circuit which discriminates between coins and unwanted metal objects such as ferrous and non-ferrous pull tabs from pop and beer cans. The discriminating circuit includes an L/C circuit which is forced to resonate at a frequency significantly higher than its natural resonance frequency. This L/C circuit is adapted to provide an output signal having different amplitudes depending on the type of metal object which is in the proximity of the L/C circuit. The L/C circuit is physically located in a sensing head or probe which the searcher moves over a given search area. When the probe is proximate a metal object, this object alters the resonance characteristics of the L/C circuit and the amplitude of the output signal from the L/C circuit. As the probe moves towards metal objects such as pennies, the amplitude of the output signal increases. As the probe moves towards other types of metal objects such as pull tabs, the amplitude of the output signal remains about the same or diminishes slightly. This discernible difference in amplitudes produced by the different types of metal objects is attainable because the L/C circuit is forced to resonate at a frequency which is different and, for most metal objects, is higher than its natural resonance frequency. Because coins have a different discernible effect on the resonance characteristics of the L/C circuit than unwanted metal objects such as pull tabs, coins can be distinguished from pull tabs. In the preferred embodiment of my detector the increase in amplitude of the output signal due to the proximity of the coin is used to activate a signal generator which provides audio and visual signals indicating the presence of a coin. The signal generator is not activated in the presence of the pull tabs. The metal detector is, however, adapted to operate in two modes. One mode distinguishes between pull tabs and coins as described above. The other mode does not distinguish between coins and pull tabs, but will distinguish between coins and bottle caps, metal foil and other ferrous junk. Depending on the prevalence of pull tabs in a given search area, one mode may be preferable to the other mode.

5 Claims, 7 Drawing Figures

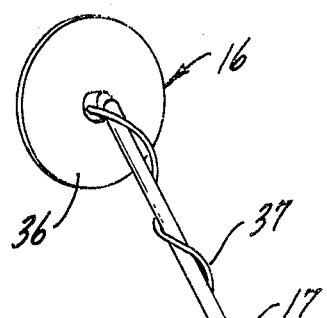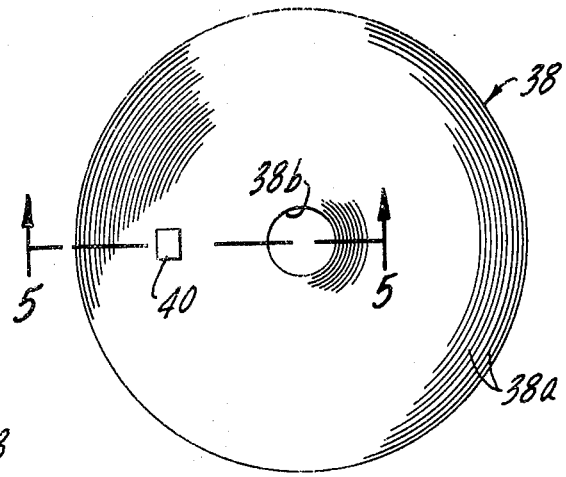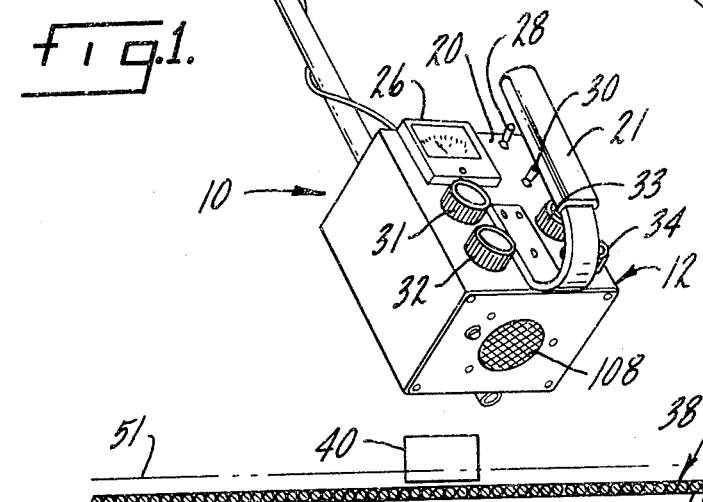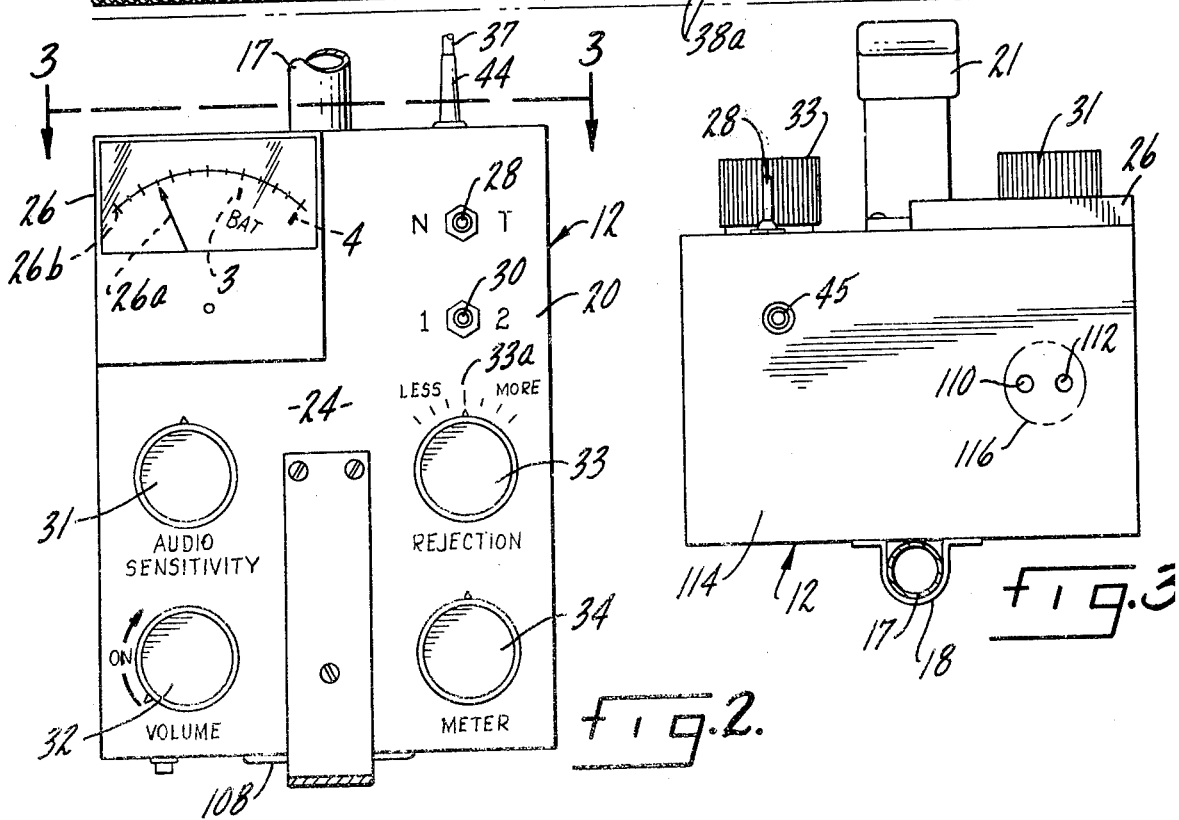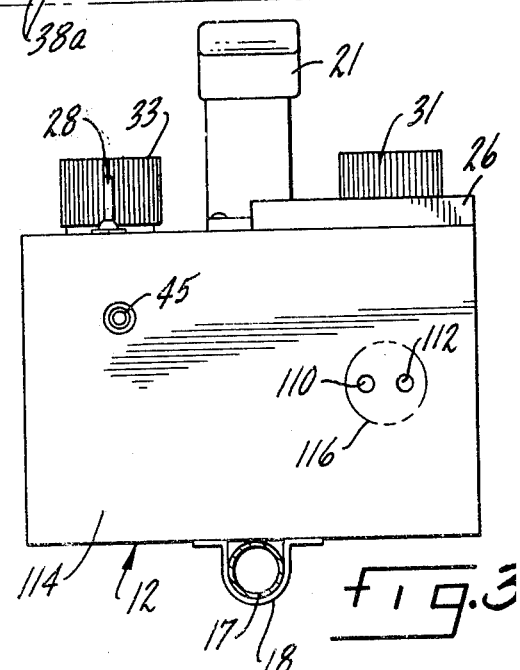

METAL DETECTOR WITH A RESONATING CIRCUIT BEING DRIVEN BY A FREQUENCY HIGHER THAN ITS NATURAL RESONANCE FREQUENCY

BACKGROUND

Recently, treasure hunting has become a recreational pastime in which many people are participating. The average searcher uses a lightweight, portable metal detector which provides an audio and visual signal when the sensing head or probe of the metal detector is in the proximity of, for example, a coin buried in sand or concealed by thick grass. Picnic areas, beaches, fair grounds, or any area where large crowds gather will contain treasure-trove such as lost coins, rings or other kinds of jewelry. Unfortunately, such areas are usually littered with steel or aluminum pull tabs from pop or beer cans, metal foil, nails, empty bullet shells from target shooting concessions, bottle caps, and other ferrous and non-ferrous junk and unwanted metal objects. Many types of conventional metal detection equipment, however, do not have the capability to distinguish between the desired coins and the unwanted metal objects. Consequently, the searcher must go through the futile act of retrieving the unwanted objects. Some detectors are equipped with discrimination circuitry, however, they only provide a visual signal which requires the searcher to continually watch a meter needle. Such conventional detectors usually have a search range and a discrimination range, and the searcher is required to continually make adjustments with the controls in an attempt to distinguish between valuable coins and rings and the unwanted metal objects.

SUMMARY OF THE INVENTION

I have now invented a metal detector which has the capability of discriminating between different types of metal objects, and specifically to discriminate between coins and unwanted metal objects such as pull tabs, metal foil, bottle caps, etc. My detector is calibrated at the factory so that it is simple to operate and need not be adjusted in the field except for simple tuning or mode selection. Moreover, my detector provides an audio signal which tells the searcher whether the discovered item is a desirable coin or an unwanted metal object.

Briefly, my detector comprises a sensing head or probe including an induction coil. This coil is in a resonating L/C circuit which provides an output signal whose amplitude changes according to the type of metal object which is in the proximity of the probe. The output signal from the L/C circuit will normally have a maximum amplitude when the circuit is remote from a metal object and is resonating at its natural resonance frequency. In accordance with my invention, the L/C circuit is driven at a fixed frequency which is different, usually higher, than the natural resonance frequency of the L/C circuit. Consequently, different types of metal objects will have different, discernible effects on the resonance characteristics of the L/C circuit and the output signal from this circuit. With the probe proximate one type of metal object, the output signal from the L/C circuit will have a one amplitude. With the probe proximate a different type of metal object, the output signal from the L/C circuit will have another amplitude different from the first amplitude. For example, coins will ordinarily cause the L/C circuit to generate a signal of higher amplitude than signals due to unwanted objects such as a metal pull tab. One of these output signals activates an audio signal generator. For example, if the signal having the higher amplitude is used to activate the signal generator, the audio signal generated indicates the presence of a coin. Thus, the presence of a coin generates an audio signal, whereas the presence of a pull tab does not.

My novel detector is shown in the accompanying drawings and explained in detail in the following description.

THE DRAWINGS

FIG. 1 is a perspective view of my novel detector.

FIG. 2 is a plan view of the top of the detector's housing containing my novel discriminating circuit. The top of the housing contains the control panel of the detector.

FIG. 3 is a side elevational view of the detector taken along line 3—3 of FIG. 2.

FIG. 4 is a plan view of the induction coil and capacitor in the sensing head or probe of the detector.

FIG. 5 is a cross-sectional view taken along line 5—5 of FIG. 4.

DETAILED DESCRIPTION

Figure 6:
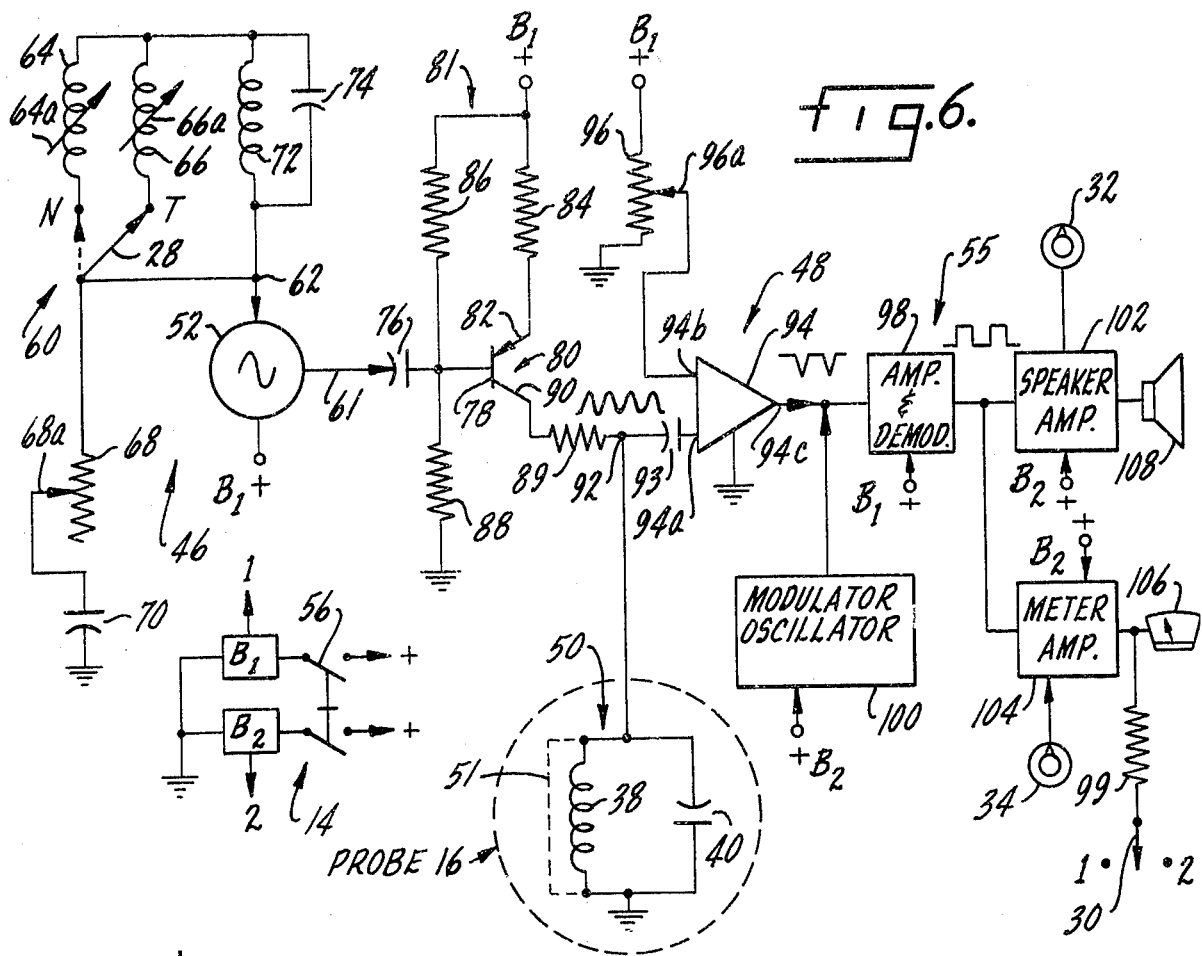
FIG. 6 is a combination schematic and block wiring diagram showing my novel discriminating circuit.

As illustrated in FIGS. 1 through 5, the metal detector 10 of my invention is a lightweight, portable unit including a sensing head or probe 16 which senses concealed metal objects, and a housing 12 which contains my novel discriminating circuit 14 (FIG. 6). This probe 16 is connected to one end of a telescoping rod 17 by an adjustable connection (not shown) which permits the probe 16 to be positioned so that it parallels the ground during searching. The rod 17 connects the probe 16 to the housing 12, with brackets 18 (FIG. 3) securing the rod to the underside of the housing. On the top 20 of the housing 12 there is secured a handle 21 for carrying the detector 10 and pointing the probe 16 in the desired direction. The top 20 of the housing 12 serves as a control panel 24 displaying a meter scale 26 and needle 26a, control switches 28 and 30, and control dials 31, 32, 33 and 34.

As best shown in FIGS. 4 and 5, the probe 16 comprises a casing 36 (FIG. 1) which includes a 1 millihenry, 2.0 ohm induction coil 38 and a 10,000 picofarad capacitor 40 positioned over the coil. The induction coil 38 has approximately 100 adjacent turns 38a which all lie in generally the same plane. About 24 gauge wire is preferred. The induction coil 38 has a width of approximately 5½ inches and an open center 38b about one inch wide. The insulation about the individual turns 38a of the coil 38 is treated with a self-bonding material which on heating becomes tacky. After the required number of turns 38a have been made, the coil 38 is heated to approximately 300°F so that the self-bonding material of one turn 38a flows into or sticks to an adjacent turn. On cooling, the insulation hardens and the coil 38 is a rigid structure, with the turns 38a of the coil cemented to each other. The capacitor 40 and coil 38 are connected in the discriminating circuit 14 by shielded cord 37 which extends from the casing 36 and winds about rod 17. At the end of this cord 37 is a plug 44 which fits into a suitable receptacle 45 (FIG. 3) in the housing 12. Although not absolutely required, it is preferable that the capacitor 40 and coil 38 both be in the casing 36 of the probe 16 so that they are subjected to the same temperature conditions. Thus, any changes in temperature or other ambient conditions will have the same impact on both the capacitor 40 and coil 38 and provide automatic compensation.

As schematically illustrated in FIG. 6, the discriminating circuit 14 has four principal subcircuits: an oscillator circuit 46, a driver circuit 81, a L/C circuit 50, a level detection circuit 48. The oscillator circuit 46 provides at its output 61 a signal having a predetermined frequency. The driver circuit 81, coupled at junction 92 to the output side of the L/C circuit 50, drives or forces the L/C circuit to resonate at the same frequency as the oscillator signal at the oscillator output 61. The level detection circuit is adjusted so that with the probe 16 remote from a metal object the signal generating circuit 55 is deactivated. If the probe 16 is proximate a detectable metal object, the amplitude of the output signal at junction 92 exceeds a predetermined limit, and the level detection circuit 48 detects this increase in amplitude and activates the signal generating circuit 55, which then provides audio and visual signals.

The oscillator circuit 46 includes a conventional RF oscillator 52 and a calibration circuit 60. The RF oscillator 52 has its output 61 coupled by a 3,000 picofarad capacitor 76 to the driver circuit 81. The RF oscillator 52 also has a terminal 62 connected to the calibration circuit 60.

The calibration circuit 60 is designed so that the frequency of the signal at the output 61 will be in the range of from about 48 to about 58 kilohertz. This circuit 60 includes a pair of 3 to 10 millihenry variable induction coils 64 and 66, respectively, having adjustable cores 64a and 66a, a 2.5 millihenry induction coil 72, a 5,100 picofarad capacitor 72, a 1,000 ohm variable resistor 68 having a slider 68a, a 1,000 picofarad capacitor 70, and the mode control switch 28. Depending on the position of the switch 28, one of the coils 64 or 66 will be in parallel connection with the resonating circuit including the parallel connected coil 72 and capacitor 74. The position of the switch 28 and the position of the slider 68a governs the frequency of the oscillator signal at output 61. When the switch 28 is in the position indicated in solid lines [the T position or total mode], the frequency of the osicllator signal at the output 61 will be about 180 cycles per second lower than the frequency of this signal when the switch 28 is in the position indicated in dotted lines [the N position or normal mode]. Moving the dial 33, which is mechanically connected to the slider 68a, also changes the frequency of the signal at output 61. With the dial 33 centered as shown in FIG. 2, the slider 68a will be in about the middle of the resistor 68. Under this condition, with the switch 28 in the (T) position, the frequency of the signal at output 61 will be about 53.369 kilohertz, and with the switch 28 in the (N) position, the frequency of the signal at output 61 will be about 53.548 kilohertz. Turning the dial 33 clockwise as viewed in FIG. 2, decreases the frequency of the signal at the output 61, and vice versa.

The driver circuit 81 includes a transistor 80 having its base 78 coupled to the capacitor 76. A 10 kilohm resistor 84 couples the emitter 82 of the transistor 80 to the power supply, and two 100 kilohm resistors 86 and 88, connected to the base 78 and capacitor 76 and in series connection between the power supply and ground, bias and base 78 of the transistor 80. The collector 90 of the transistor 80 is connected to the output side of the L/C circuit 50 at the junction 92 through an isolation resistor 89.

The L/C circuit 50 includes the induction coil 38 equipped with a Faraday shield 51 and the capacitor 40. The coil 38 and capacitor 40 are in parallel having a common ground side and a common output side connected to the junction 92. The L/C circuit 50, resonating at the same frequency as the oscillator signal at output 61, provides signals at junction 92 of different amplitudes which turn on or off the signal generating circuit 55 as governed by the setting of the level detection circuit 48. Two factors regulate the amplitude of the signal at the junction 92: the frequency of the oscillator signal and the proximity or remoteness of the probe 16 and specific types of metal objects.

The level detection circuit 48 includes a differential amplifier 94 having one input 94a connected to the junction 92 through a coupling capacitor 93, another input 94b connected through a 10 kilohm variable resistor 96 to the power supply, and an output 94c connected to the signal generating circuit 55. The position of the slider 96a of the resistor 96 is controlled by the dial 31 (FIG. 2). Turning this dial 31 clockwise moves the slider down, decreasing the voltage signal to the input 94b of the differential amplifier 94, and vice versa. As long as the maximum voltage signal at input 94a equals or is less than the voltage signal at input 94b, there is no signal at the output 94c.

Signal generating circuit 55 is conventional and it includes a modulation-oscillator 100, a pulse shaping amplifier and demodulator 98, a speaker amplifier 102, a meter amplifier 104, a speaker 108 and and a volt meter 106. The scale 26 of meter 106 is shown in FIG. 2. The output 94c of the differential amplifier 94 is connected to both the oscillator 100 and the pulse shaping amplifier 98. Whenever a detectable metal object is in the proximity of the probe 16, the L/C circuit 50 resonates in a manner such that the amplitude of the signal at junction 92 exceeds the voltage signal at input 94b. As long as the L/C circuit 50 continues to resonate in this manner, the differential amplifier 94 generates at its output 94c a series of inverted spiked control signals. The frequency of these spiked signals is equal to the frequency of the signal at junction 92, which is well outside of the audio range. Consequently, these spiked signals must be modulated so that they are in the audio range. Also, these spiked signals must be shaped, demodulated and amplified so that they can operate the speaker 108 and volt meter 106. The oscillator 100 serves to modulate spiked signals, converting them into audio signals, and the amplifier-demodulator 98 shapes, demodulates and amplifies the spiked audio signals, amplifying the spiked audio signals and shaping them so they approach square wave signals. The sensitivity of the speaker 108 and meter 106 to the signal from the amplifier 98 may be regulated by adjusting potentiometers (not shown) in the amplifiers 102 and 104. The dials 32 and 34, respectively, control the potentiometer settings in the amplifiers 102 and 104.

Power to the discriminating circuit 14 is supplied by two nine volt batteries $B_1$ and $B_2$. The positive sides of these batteries are connected through a double pole, single throw switch 56 to the terminals of the discriminating circuit 14 as indicated. Dial 32 is mechanically connected to the switch 56 so that turning this dial clockwise as viewed in FIG. 2 closes the switch 56 to provide power to the discriminating circuit 14. A battery check circuit including a limiting resistor 99, the switch 30, and terminals 1 and 2 is provided. On moving the switch 30 to terminal 1 the meter needle 26a will be deflected to the right as viewed in FIG. 2. If the needle 26a moves between the lines 3 and 4 on the scale 26a, the battery $B_1$ is operational. Battery $B_2$ is checked in a similar manner by moving the switch 30 to terminal 2.

Figure 7:
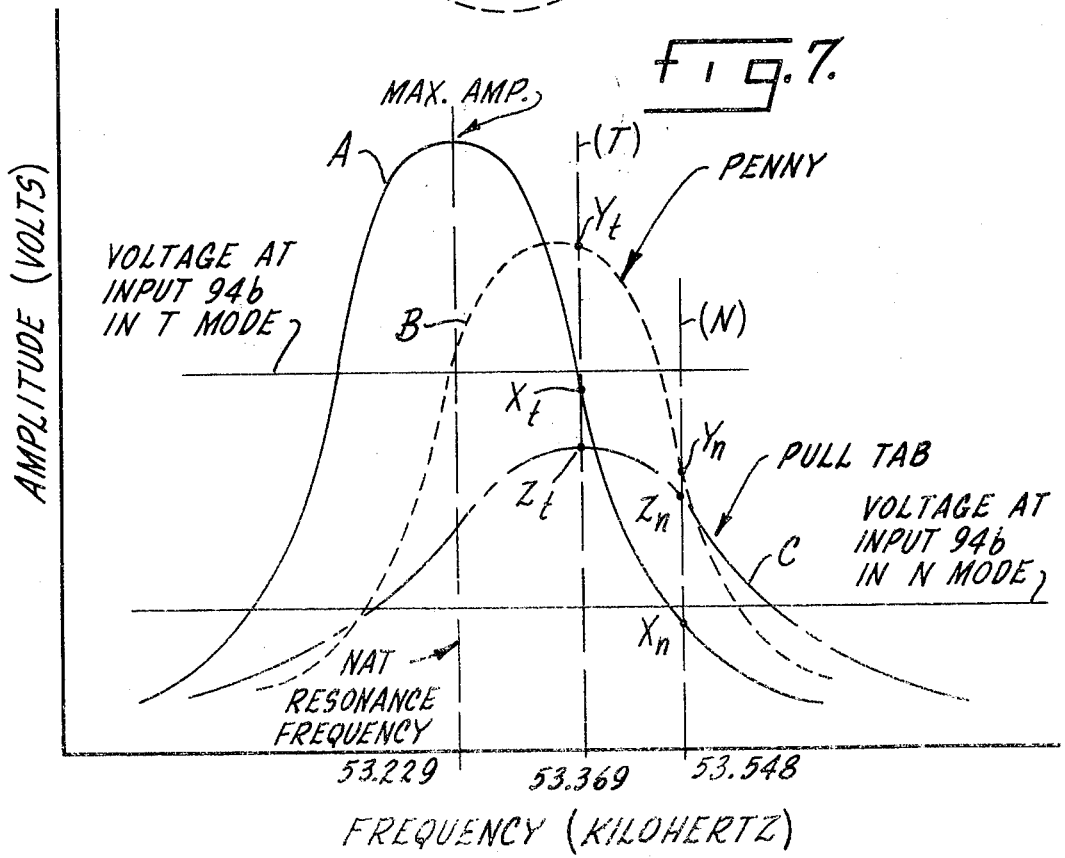
FIG. 7 is a graph depicting the effects different types of metal objects have on the resonance characteristics of the L/C circuit of the discriminating circuit.

In accordance with my invention, the L/C circuit 50 resonates at a fixed frequency different, and for most applications, significantly higher than its natural resonance frequency. This feature gives the discriminating circuit 14 the capability to distinguish between different types of concealed metal objects. Turning to FIG. 7, curve A schematically illustrates that the L/C circuit 50, with the probe 16 remote from a metal object, has a maximum amplitude when it resonates at its natural resonance frequency of about 53.229 kilohertz. When the probe 16 is in the proximity of a metal object, the metal object alters the resonance characteristics of the L/C circuit 50. Under such conditions, the amplitude of the output signal of the L/C circuit 50 is less than the maximum amplitude of an output signal where the circuit 50 is resonating at its natural resonance frequency and remote from a metal object. This change amplitude is schematically illustrated by curves B and C, which are exaggerated to illustrate the change in amplitude. Curve B depicts the change in amplitude of the output signal from the L/C circuit 50 when the probe 16 is in the proximity of a penny. Curve C depicts the change in amplitude of the output signal from the L/C circuit 50 when the probe 16 is in the proximity of a pull tab from a pop or beer can. The shape as well as the chemical composition and mass of the metal object have a distinctive effect on the resonance characteristics of the L/C circuit 50. Depending on the frequency at which the circuit 50 is resonating, the different types of metal objects will have a greater or lesser impact on the resonance characteristics, and specifically the amplitude of the signal at junction 92.

In the embodiment illustrated, the L/C circuit 50 is forced to resonate at a frequency which is about 0.2 to about 0.5 percent higher than its natural resonance frequency. Under such conditions, when the probe 16 approaches a metal object such as a penny, the amplitude of the output signal from the L/C circuit 50 will increase, and when the probe 16 approaches a metal object such as a steel or aluminum pull tab, the amplitude of the output signal from the circuit 50 will decrease or remain about the same. Consequently, coins such as pennies can be distinguished from unwanted metal objects such as pull tabs. In general, metal objects have an effect on both the inductance of the coil 38 and the Q factor of this coil. (The Q factor is the difference between the A.C. resistance and the D.C. resistance of the coil 38.) Different types of metal objects, depending on the shape, size, mass and chemical composition, have characteristic effects on the inductance and Q factor of the coil. Consequently, different types of metal objects can be distinguished if the impact of the coil is substantially different. When the discriminating circuit 14 is in the total (T) mode, my discriminating circuit can distinguish non-ferrous metal objects, which generally produces an increase in signal amplitude from ferrous metal objects, which generally produces a decrease in signal amplitude.

The impact of different types of metal objects on the amplitude of the output signal from the L/C circuit 50 is best appreciated by comparing what occurs at the two different modes of operation. In the total (T) mode, the switch 28 is moved to the (T) position, and the oscillator 52 and L/C circuit 50 are resonating at a frequency of about 53.369 kilohertz. With the probe 16 remote from any metal object, the amplitude of the output signal from the L/C circuit 50 is equal to $X_t$ volts. The dial 31 is adjusted, positioning the slider 96a so that the voltage signal at input 94b is just equal or slightly higher than $X_t$ volts. The person using the metal detector 10 will know when the voltages at the inputs 94a and 94b equal as he hears the humming noise from the speaker 108 gradually diminishing and finally becoming inaudible. When the probe 16 passes over a metal object such as a penny, the amplitude of the output signal from the L/C circuit 50 increases to $Y_t$ volts. This increase in amplitude is detected by the differential amplifier 94 which turns on the speaker amplifier 102, which in turn generates an audio signal indicating the proximity of the penny. The meter needle 26a is also deflected to provide a visual signal. When the probe 16 passes over a pull tab, the amplitude of the signal from the L/C circuit 50 decreases slightly and is equal to $Z_t$. Consequently, the amplifier 94 does not turn on the speaker and meter amplifiers 102 and 104 and no audio or visual signal is generated. If the switch 28 is moved to the (N) position, the frequency of the oscillator signal at output 61 is 53.548 kilohertz. Hence, the output signal from the L/C circuit 50 also equals 53.548 kilohertz. The slider 96a is readjusted by turning the dial 31 until the voltage level at input 94b is about equal to the new amplitude of the signal from the L/C circuit 50, i.e., $X_n$ volts. Again the searcher listens to the sound from the speaker to judge when the voltages at the inputs 94a and 94b are equal. Under these conditions, when the probe 16 passes over a pull tab or a penny, the amplitude from the output signal from the L/C circuit 50 increases and exceeds the voltage level at the input 94b. These new amplitudes are $Z_n$ and $Y_n$ volts and they are about equal. Both these amplitudes $Z_n$ and $Y_n$ trigger the spiked control signal of the differential amplifier 94. In other words, both pull tabs and pennies will activate the signal generating circuit 55, causing it to generate an audio and visual signal indicating the presence of a metal object proximate the probe 16. It should be noted that once the frequency of the L/C circuit 50 is established, it does not fluctuate when the probe 16 moves into proximity with a detectable metal object.

CALIBRATION

The discriminating circuit 14 is calibrated empirically to distinguish between different types of metal objects such as coins, pull tabs, foil and bottle caps. First, the circuit 14 is calibrated for the total (T) mode. With the switch 28 in the total (T) position, a penny is placed on a suitably insulated support and the probe 16 is passed over the penny. When the penny is directly beneath the probe 16 and its center is in registration with the center of the coil 38, the slider 96a of the resistor 96 is adjusted so that the audio signal from the speaker 108 is a steady humming sound. The probe 16 is then repeatedly moved passed the penny and the slider 96a and core 66a are repeatedly adjusted until the volume of the audio signal from the speaker 108 increases as the center of the probe 16 moves into registration with the penny. The audio signal will be the loudest when the coil 38 is centered over the penny. The increasing volume of the audio signal indicates that the frequency of the oscillator 52 is higher than the natural resonance frequency of the L/C circuit 50. Next, the penny is removed from the insulated support and a pull tab is placed on the support. The calibrating procedure of above is repeated and the slider 96a and core 66a are adjusted until the volume or tone of the audio signal does not change as the probe 16 moves toward and away from the pull tab. In other words, changes in the amplitude of the output signal from the L/C circuit 50 are insufficient to trigger the differential amplifier 94 and produce any detectable change in the tonal quality or volume of the audio signal from the speaker 108. This calibrates the discriminating circuit 14 so that an audio signal occurs when the probe 16 is proximate pennies or metal objects which have a similar effect on resonance characteristics of the L/C circuit 50 as pennies, but no such audio signal occurs when the probe 16 is proximate pull tabs or metal objects which have a similar effect on the resonance characteristics of the L/C circuit as a pull tab.

With the discriminating circuit 14 calibrated for total (T) mode, it is then calibrated for the normal (N) mode. With the switch 28 in the (N) position, a penny is placed on the insulated support, and the probe 16 is moved into registration with the penny so that the center of the probe is coincident with the center of the penny. The slider 96a and a core 64a are adjusted so that there is an audio signal from the speaker 108. The probe 16 is repeatedly moved towards and away from the penny, and the sliders 96a and core 64a are adjusted until the volume of the audio signal from the speaker 108 increases as the center of the probe 16 moves into registration with the center of the penny. Next, the penny is removed from the support and an inverted bottle cap is placed on the support with the inside or cup of the bottle cap facing the probe 16. The slider 96a and core 64a are readjusted so that, as the probe 16 moves over the bottle cap, the volume or tone of the audio signal remains constant. In other words, the bottle cap fails to produce a detectable change in the amplitude of the output signal from the L/C circuit 50. The discriminating circuit 14 is now calibrated to distinguish between bottle caps and the like and pennies or similar coins. In this normal (N) mode, however, the discriminating circuit 14 is also sensitive to the presence of pull tabs and will generate an audio signal if the probe 16 passes over a pull tab.

Once the cores 64a and 66a have been adjusted to calibrate the discriminating circuit 14, they are fixed in a stationary position in their respective coils 64 and 66. As shown in FIG. 3, the housing 12 has a pair of access openings 110 and 112 in the front panel 114 of the housing. Opening 110 is aligned with the coil 66 so that a screw driver may be inserted through the opening to adjust the position of the core 66a. Similarly, the opening 112 is aligned with the coil 64 to permit the passage of a screw driver to adjust the core 64a. The detector 10 is first assembled with the discriminating circuit 14 protected by the housing 12, and then it is calibrated at the factory as described above using a screw driver to adjust the positions of the cores 64a and 66a. With the cores 64a and 66a adjusted, a few drops of an adhesive are placed on these cores 64a and 66a by means of an eye dropper inserted through the openings 110 and 112. This adhesive prevents any further movement of these cores 64a and 66a. The openings 110 and 112 are then covered with a decal or cover plate 116.

OPERATION

To operate my metal detector 10 the searcher, after selecting his search area, simply turns the dial 32 clockwise to supply power to the discriminating circuit 14. Preferably maximum power is provided to the speaker amplifier 102. Depending on the searcher's estimate of the prevalency of pull tabs in the search area, the searcher will either switch the switch 28 to the total (T) or normal (N) position. After making the mode selection, the searcher places the probe 16 a few inches above the ground and adjusts the dial 31 until the speaker 108 provides a very low level humming noise, or preferably no noise by setting the voltage at the input 94b of the differential amplifier 94 to just equal the signal at the input 94a of this amplifier 94. the dial 34 is also adjusted so that the meter needle 26a is at the zero position 26b on the meter scale 26.

Assuming the searcher initially operates in the normal (N) mode, the detector 10 will provide an audio signal when the probe 16 moves into proximity with a coin or pull tab. This audio signal could be a change in the noise level or tone of the audio signal or it could be a change from an inaudible to audible signal. The meter needle 26a will also deflect to the right and give a visual indication to the searcher that a coin or pull tab is in the proximity of the probe 16. If the searcher finds a great number of pull tabs, he will switch the switch 28 to the (T) position and readjust the dials 31 and 34 as described above. The metal detector 10 will now be set to discriminate between coins and both ferrous and non-ferrous pull tabs. This is a highly desirable feature absent in conventional metal detectors.

I have found that pull tabs have about the same impact on the resonance characteristics of the L/C circuit 50 as a nickel coin. Thus, in the total (T) mode, nickel coins will not be detected. This will be acceptable in a search area strewn with a great number of pull tabs. Such conditions would necessarily induce the searcher to sacrifice the nickel coins in order to avoid the futility of discovering the pull tabs. However, if the searcher believes the search area is not littered with many pull tabs, he will operate in normal (N) mode.

Dial 33 provides the searcher with the option to fine tune or calibrate the discriminating circuit 14 in the field. This may be desirable to correct for extreme temperatures, unusual ground conditions, or changes in the battery voltage with age. Normally, the dial 33 is centered at 33a as shown in FIG. 2. If the searcher turns the dial 33 counterclockwise as viewed in FIG. 2, the slider 68a is adjusted to increase the frequency of the output signal from the RF oscillator 52. Consequently, the discriminating circuit 14 will be less selective, i.e., a greater number of different types of metal objects will be detected. If the searcher turns the dial 33 clockwise as viewed in FIG. 2, the slider 68a is adjusted to decrease the frequency of the output signal from the RF oscillator 52. This increases the selectivity of the discriminating circuit 14, i.e., a fewer number of different types of metal objects will be detected. Since any adjustments of the dial 33 change the operating frequency of the L/C circuit 50, the slider 96*a* will have to be changed accordingly to set the response of the level detection circuit 48.

To test the adjustments of the metal detector 10, the searcher may simply place a coin and an unwanted metal object on the ground of the selected search area and pass the probe 16 over these items, making any necessary adjustments in the dials 31 through 34 so that the metal detector 10 responds as the searcher desires.

I have found that my metal detector 10 has the capability of detecting a wide range of different types of metal objects, and most importantly, has the capability of discriminating between certain types of metal objects, particularly between coins and non-ferrous and ferrous pull tabs. Moreover, my metal detector 10 has a great deal of versatility. It has two different factory calibrated modes of operation, and selectivity dial 33 which gives the searcher the option to make slight calibration adjustments to meet specific field conditions.

As appreciated by those skilled in the art, modifications can be made in my detector 10 without departing from the novel principles embodied therein. For example, the detector could be modified to distinguish between concealed weapons and coins carried on the person of an individual. In this instance, the signal generating circuit would be modified to provide an audio or visual signal in the presence of bulky ferrous metal objects such as weapons and not provide such a signal in the presence of non-ferrous metal objects such as coins.

I claim:

1. A metal detecting device having a discriminating mode in which said device discriminates between different types of metal objects such as, for example, coins like pennies and junk objects like pull tabs, bottle caps, foil, etc., comprising a probe containing an induction coil;

a non-bridge type resonating circuit including said coil and a capacitor;

an oscillator which during the discriminating mode provides a driving signal which has a predetermined frequency that is significantly higher than the natural resonance frequency of said resonating circuit;

means coupling the oscillator to the resonating circuit through isolation means which prevent feedback from the resonating circuit to the oscillator so that the frequency of the driving signal remains constant during the discriminating mode;

said resonating circuit being driven by the driving signal so that it provides three different types of output signals having characteristic amplitudes, namely, a. a first output signal having a predetermined amplitude when the probe is remote from a metal object, b. a second output signal having an amplitude greater then the amplitude of the first output signal when the probe is proximate a metal object having an effect on the electrical properties of the coil generally similar to that of an object such as a coin like a penny, c. a third output signal having an amplitude about the same as or less than the amplitude of the first output signal when the probe is proximate a metal object having an effect on the electrical properties of the coil generally similar to that of junk objects such as a pull tab, bottle cap, foil, etc., and means responsive to the second output signal for providing an indication that the probe is proximate a metal object such as a coin.

2. The device of claim 1 where the isolation means includes a transistor.

3. The device of claim 1 where the coil is flat with the individual turns of the coil being generally in the same plane.

4. The device of claim 1 where the indication means provides an audio indication.

5. the device of claim 1 being adapted to switch between the discriminating mode of operation and a non-discriminating mode of operation.

* * * * *